US008791950B2

(12) United States Patent
Wang

(10) Patent No.: US 8,791,950 B2
(45) Date of Patent: Jul. 29, 2014

(54) ELECTRONIC DEVICE AND METHOD FOR CONTROLLING DISPLAY OF ELECTRONIC FILES

(75) Inventor: Cho-Hao Wang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 167 days.

(21) Appl. No.: 13/491,522

(22) Filed: Jun. 7, 2012

(65) Prior Publication Data

US 2012/0326970 A1 Dec. 27, 2012

(30) Foreign Application Priority Data

Jun. 21, 2011 (TW) .............................. 100121541 A

(51) Int. Cl.
*G06T 13/00* (2011.01)
(52) U.S. Cl.
USPC ............................ 345/474; 345/473; 345/156
(58) Field of Classification Search
USPC ................. 345/173, 174, 156, 665; 715/753; 382/100, 118; 434/323; 381/70; 352/50; 348/515
See application file for complete search history.

(56) References Cited

U.S. PATENT DOCUMENTS

| 4,600,281 | A  | * | 7/1986 | Bloomstein | 352/50 |
| 4,827,532 | A  | * | 5/1989 | Bloomstein | 382/100 |
| 5,233,662 | A  | * | 8/1993 | Christensen | 381/70 |
| 5,880,788 | A  | * | 3/1999 | Bregler | 348/515 |
| 6,665,643 | B1 | * | 12/2003 | Lande et al. | 704/266 |
| 6,697,120 | B1 | * | 2/2004 | Haisma et al. | 348/515 |
| 6,919,892 | B1 | * | 7/2005 | Cheiky et al. | 345/473 |
| 7,027,054 | B1 | * | 4/2006 | Cheiky et al. | 345/473 |
| 8,597,031 | B2 | * | 12/2013 | Cohen et al. | 434/323 |
| 2006/0009978 | A1 | * | 1/2006 | Ma et al. | 704/266 |
| 2006/0204060 | A1 | * | 9/2006 | Huang et al. | 382/118 |
| 2010/0007665 | A1 | * | 1/2010 | Smith et al. | 345/473 |
| 2010/0205541 | A1 | * | 8/2010 | Rapaport et al. | 715/753 |

* cited by examiner

*Primary Examiner* — Thuy Pardo
(74) *Attorney, Agent, or Firm* — Novak Druce Connolly Bove + Quigg LLP

(57) ABSTRACT

An electronic device displays electronic files on a display device. When a user views the electronic device, a video camera captures a real-time video consisting of a plurality of frames of the user. The electronic device recognizes a face region in each frame and a lip outline in the face region of the frame, and generates a lip shape variation video of a lip of the user according to the lip outline in each frame and a capturing time of each frame. Furthermore, the electronic device searches a preset lip-language video that are pre-stored in a storage device and matches the lip shape variation video, and controls display of the electronic files by executing an voice command associated with the matched preset lip-language video.

17 Claims, 3 Drawing Sheets

ELECTRONIC DEVICE AND METHOD FOR CONTROLLING DISPLAY OF ELECTRONIC FILES

BACKGROUND

1. Technical Field

The embodiments of the present disclosure relate to automatic control systems and methods, and more particularly to an electronic device and a method for controlling display of electronic files of the electronic device.

2. Description of Related Art

When viewing electronic files on an electronic device, users often manipulate the electronic files using a keyboard or a touch screen of the electronic device. Due to sensitivity limitations of the keyboard and the touch screen, the operations may be slow and time-consuming. In addition, frequent operations may cause damage to the keyboard or the touch screen.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
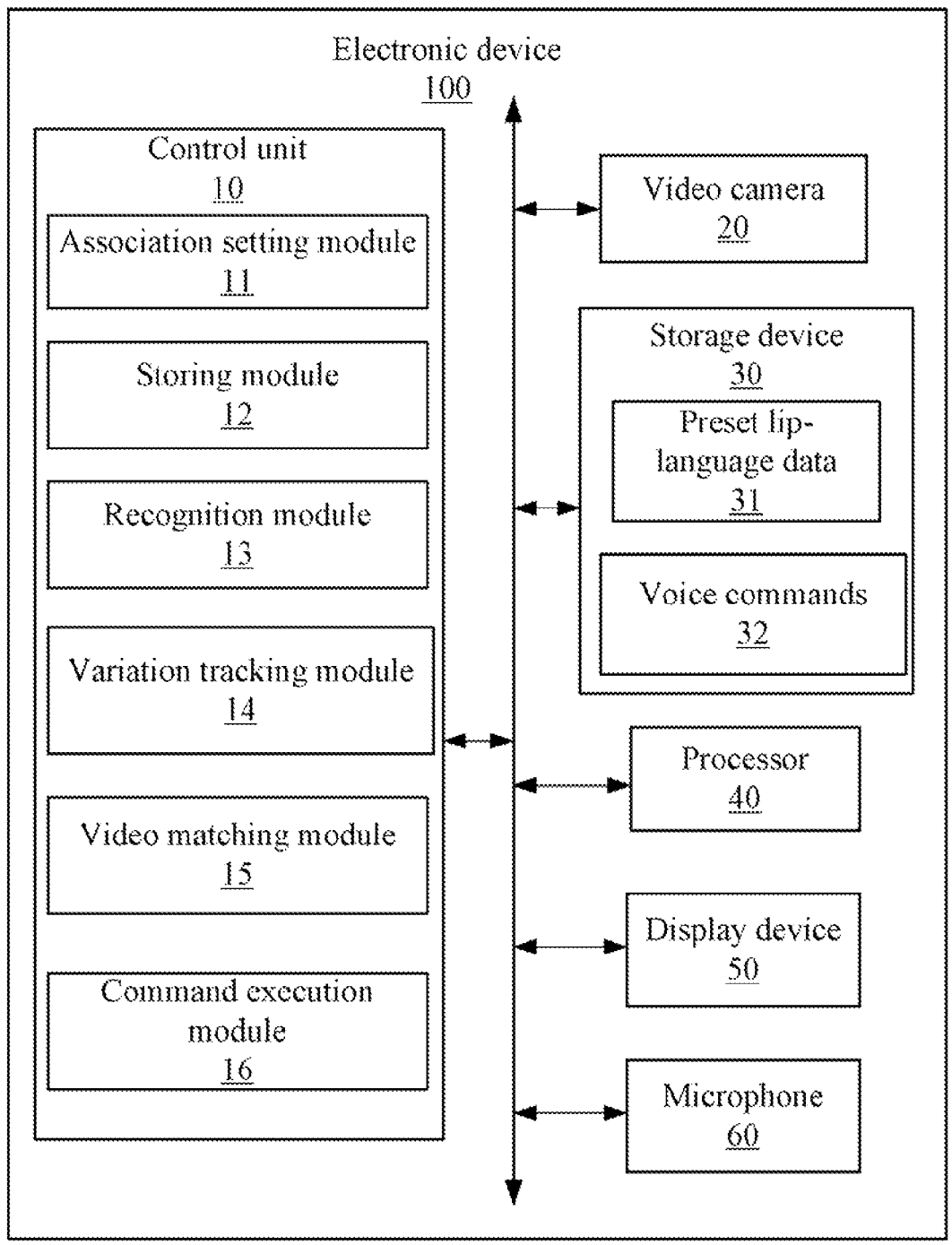
FIG. 1 is a block diagram of one embodiment of an electronic device having a lip-language control function for controlling display of electronic files.

FIG. 1 is a block diagram of one embodiment of an electronic device 100. In this embodiment, the electronic device 100 includes a control unit 10, a video camera 20, a storage device 30, a processor 40, a display device 50, and a microphone 60. In other embodiments, the video camera 20 can be independent from the electronic device 100 and electronically connected to the video camera 20. The storage device 30 stores preset lip-language video data 31 and a plurality of voice commands 32, such as "scroll to last page," "scroll to next page," "page up," "page down," "close current web page," "minimize current web page," for example.

In this embodiment, the preset lip-language video data 31 includes multiple preset lip-language videos. Each of the voice commands 32 is associated with a preset lip-language video. Each preset lip-language video records lip shape variations of a lip of a user when the user speaks an associated voice command. For example, a preset lip-language video associated with a voice command "scroll to next page" records the lip shape variations of the lip of the user when the user speaks "scroll to next page." The voice commands 32 includes computerized instructions that are executable by the processor 40 to achieve user-desired operations.

When the user views electronic files (such as web pages) displayed on the display device 50, the video camera 20 captures a real-time video consisting of a plurality of frames of the user. The control unit 10 determines lip shape variations the lip of the user in the real-time video by analyzing each frame of the real-time video, searches a preset lip-language video in which lip shape variations match the lip shape variations of the lip of the user in the real-time video, and executes a voice command 32 associated with the searched preset lip-language video, to control display of the electronic files.

In this embodiment, as shown in FIG. 1, the control unit 10 includes an association setting module 11, a storing module 12, a recognition module 13, a variation tracking module 14, a video matching module 15, and a command execution module 16. The modules 11-16 may comprise computerized code in the form of one or more programs that are stored in the storage device 30. The computerized code includes instructions that are executed by the processor 40, to provide the aforementioned functions of the control unit 10. A detailed description of the functions of the modules 11-16 is given in FIG. 2. The storage device 30 may be a cache or a dedicated memory, such as an erasable programmable read only memory (EPROM), a hard disk driver (HDD), or flash memory.

Figure 2:
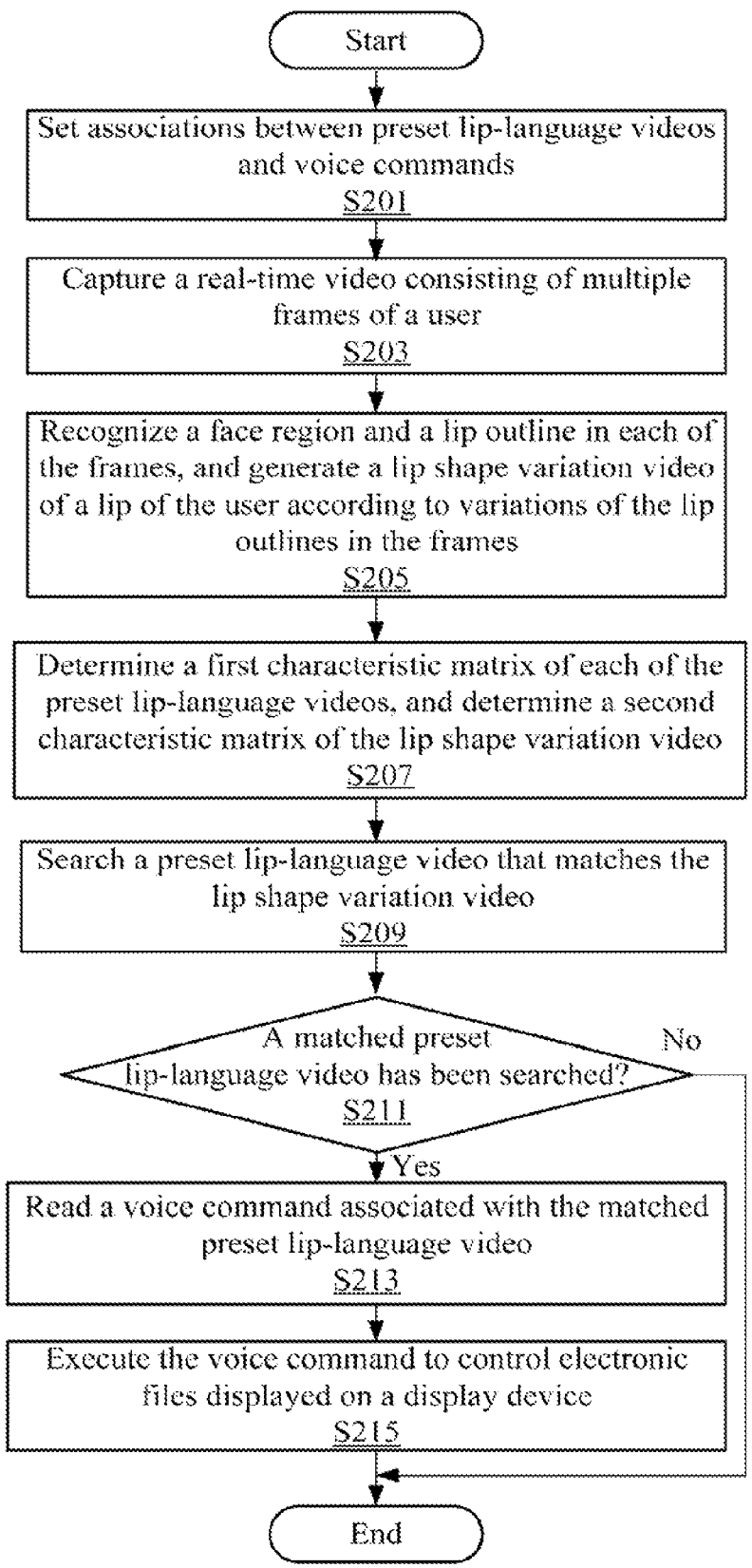
FIG. 2 is a flowchart of one embodiment of a method for controlling display of electronic files.

FIG. 2 is a flowchart of one embodiment of a method for controlling display of electronic files in the electronic device 100. Depending on the embodiment, additional steps may be added, others removed, and the ordering of the steps may be changed.

In step S201, the association setting module 11 sets associations between preset lip-language videos and voice commands 32 stored in the storage device 30. In this embodiment, the preset lip-language videos are captured by the video camera 20 when the voice commands 32 are input by a user via the microphone 60. The electronic files are web pages, the voice commands are in relation to controlling display of the web pages. The user here may be a manufacturer of the control unit 10 or an owner of the electronic device. As mentioned above, each preset lip-language video records lip shape variations of a lip of a user when the user speaks an associated voice command 32. For example, a preset lip-language video associated with a voice command "close the current page" records the lip shape variations of the lip of the user when the user speaks "close the current page" over or across the microphone 60 in front of the video camera 20. The voice commands 32 may include, but not limited to, commands such as "scroll to last page," "scroll to next page," "page up," "page down," "close current web page," and "minimize current web page."

In step S203, when a user views electronic files displayed on the display device 50, the video camera 20 captures a real-time video consisting of a plurality of frames of the user. The storing module 12 receives and stores the real-time video into the storage device 30. The user here is a person who operates the electronic device.

Figure 3:
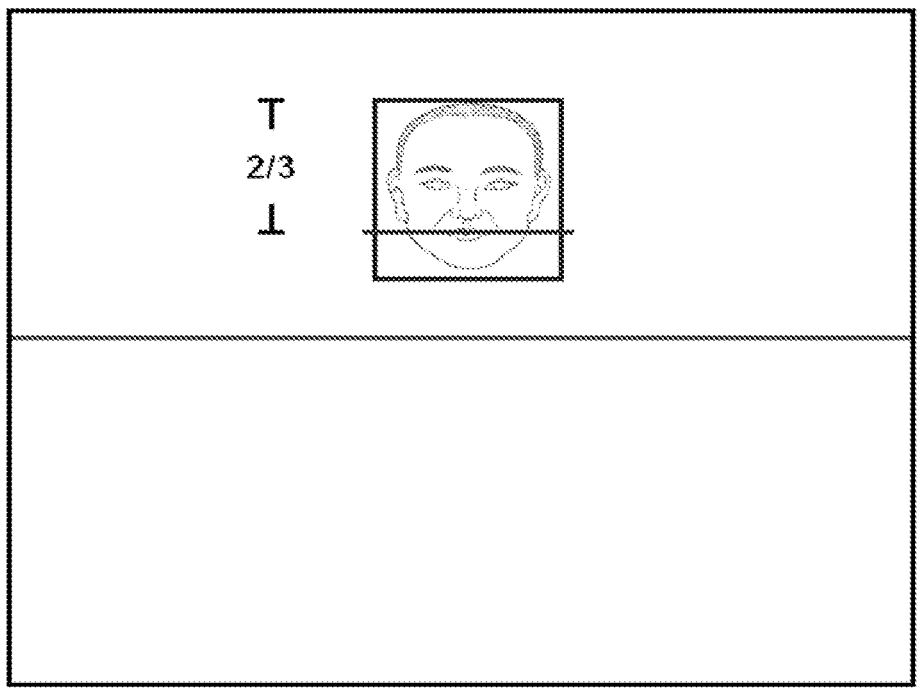
FIG. 3 is one embodiment of a facial image including a lip outline.

In step S205, the recognition module 13 recognizes a face region in each frame using a face detection method. The face detection method may include steps of: pre-storing a large number of characteristics data of human faces to create a face sample in the storage device 30, and analyzing each frame by comparing image data of the frame with the characteristics data of the face sample that includes face, eyes and mouth characteristics, and determining whether a face region is detected in the frame according to the comparison. The recognition module 13 further recognizes a lip outline in the face region of each frame. For example, in this embodiment, as shown in FIG. 3, the recognition module 13 determines ⅓ lower part in the face region as a lip area in the frame, and determines the lip outline in the frame by retrieving characteristic points in the lip area. The variation tracking module 14 generates a lip shape variation video of the lip of the user according to the lip outline in each frame and a capturing time of each frame.

In step S207, the video matching module 15 determines a first characteristic matrix of each of the preset lip-language videos, and determines a second characteristic matrix of the lip shape variation video. The first characteristic matrix is a data structure used for storing variations of pixel values of the characteristic points in the lip areas in the frames of a preset lip-language video, and the second characteristic matrix is a data structure used for storing variations of pixel values of the characteristic points in the lip areas in the frames of the lip shape variation video.

In step S209, the video matching module 15 searches a preset lip-language video that matches the lip shape variation video by comparing the second characteristic matrix with the first characteristic matrices of the preset lip-language videos one by one.

In step S211, the video matching module 15 determines if the matched preset lip-language video has been searched from the storage device 30. In this embodiment, if a similarity degree between the second characteristic matrix and a first characteristic matrix of a preset lip-language video reaches a preset proportion (such as 80%), the video matching module 15 determines the preset lip-language video matches the lip shape variation video. If no matched preset lip-language video has been searched from the storage device 30, the procedure ends. If the matched preset lip-language video has been searched from the storage device 30, the procedure goes to step S213.

In step S213, the command execution module 16 reads a voice command associated with the matched preset lip-language video from the storage device 30. For example, if the matched preset lip-language video is in relation to lip gestures of saying "minimize the current page," the command execution module 16 reads the voice command of minimizing the current web page from the storage device 30.

In step S215, the command execution module 16 executes the associated voice command to control display of the current web page displayed on the display device 50, such as minimizing the current web page.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A method being executed by a processor of an electronic device for controlling display of electronic files displayed on a display device of the electronic device, the method comprising:
   using a video camera to capture a real-time video consisting of a plurality of frames of a user of the electronic device;
   recognizing a face region of the user in each frame and a lip outline in the face region of the frame, and generating a lip shape variation video of a lip of the user according to the lip outline in each frame and a capturing time of each frame;
   determining a first characteristic matrix of each of the preset lip-language videos, and determining a second characteristic matrix of the lip shape variation video;
   searching a preset lip-language video in a storage device that matches the lip shape variation video by comparing the second characteristic matrix with the first characteristic matrices of the preset lip-language videos; and
   controlling display of the electronic files on the display device by executing a voice command associated with the matched preset lip-language video.

2. The method of claim 1, wherein before the capturing step further comprising: setting associations between preset lip-language videos and voice commands and storing the associations in the storage device.

3. The method of claim 1, wherein after the searching step further comprising: reading the voice command associated with the matched preset lip-language video from the storage device.

4. The method of claim 1, wherein recognizing the lip outline in the face region of the frame comprising:
   determining a lip area in the frame; and
   determining the lip outline in the frame by retrieving characteristic points in the lip area.

5. The method of claim 4, wherein the first characteristic matrix is a data structure used for storing variations of pixel values of the characteristic points in the lip areas in the frames of a preset lip-language video, and the second characteristic matrix is a data structure used for storing variations of pixel values of the characteristic points in the lip areas in the frames of the lip shape variation video.

6. The method of claim 1, wherein a preset lip-language video is determined as the matched preset lip-language video if a similarity degree between the second characteristic matrix of the lip shape variation video and the first characteristic matrix of the preset lip-language video reaches a preset proportion.

7. An electronic device, comprising:
   a storage device storing preset lip-language videos;
   at least one processor; and
   a control unit comprising one or more programs executable by the at least one processor, the one or more programs comprising:
   a storing module that receives and stores a real-time video consisting of a plurality of frames of a user into the storage device, wherein the real-time video is captured by a video camera when the user views electronic files displayed on a display device of the electronic device;
   a recognition module that recognizes a face region of the user in each frame, and recognizes a lip outline in the face region of the frame;
   a variation tracking module that generates a lip shape variation video of a lip of the user according to the lip outline in each frame and a capturing time of each frame;
   a video matching module that determines a first characteristic matrix of each of the preset lip-language videos, determines a second characteristic matrix of the lip shape variation video, and searches a preset lip-language video that matches the lip shape variation video by comparing the second characteristic matrix with the first characteristic matrices of the preset lip-language videos; and
   a command execution module that controls display of the electronic files on the display device by executing a voice command associated with the matched preset lip-language video.

8. The device of claim 7, wherein the one or more programs further comprising:
   an association setting module that sets associations between preset lip-language videos and voice commands and storing the associations in the storage device.

9. The device of claim 7, wherein the recognition module recognizes the lip outline in the face region of the frame comprising:
   determining a lip area in the frame; and
   determining the lip outline in the frame by retrieving characteristic points in the lip area.

10. The device of claim 9, wherein the first characteristic matrix is a data structure used for storing variations of pixel values of the characteristic points in the lip areas in the frames of a preset lip-language video, and the second characteristic matrix is a data structure used for storing variations of pixel values of the characteristic points in the lip areas in the frames of the lip shape variation video.

11. The device of claim 7, wherein a preset lip-language video is determined as the matched preset lip-language video if a similarity degree between the second characteristic matrix of the lip shape variation video and a first characteristic matrix of the preset lip-language video reaches a preset proportion.

12. A non-transitory computer-readable medium storing a set of instructions, the set of instructions capable of being executed by a processor of an electronic device to control display of electronic files displayed on a display device of the electronic device, the method comprising:

using a video camera to capture a real-time video consisting of a plurality of frames of a user of the electronic device;

recognizing a face region of the user in each frame and a lip outline in the face region of the frame, and generating a lip shape variation video of a lip of the user according to the lip outline in each frame and a capturing time of each frame;

determining a first characteristic matrix of each of the preset lip-language videos, and determining a second characteristic matrix of the lip shape variation video;

searching a preset lip-language video stored in a storage device that matches the lip shape variation video by comparing the second characteristic matrix with the first characteristic matrices of the preset lip-language videos; and controlling display of the electronic files on the display device by executing a voice command associated with the matched preset lip-language video.

13. The medium of claim 12, wherein before the capturing step further comprising: setting associations between preset lip-language videos and voice commands stored in the storage device.

14. The medium of claim 12, wherein after the searching step further comprising: reading the voice command associated with the matched preset lip-language video from the storage device.

15. The medium of claim 12, wherein recognizing the lip outline in the face region of the frame comprising:

determining a lip area in the frame; and determining the lip outline in the frame by retrieving characteristic points in the lip area.

16. The medium of claim 12, wherein the first characteristic matrix is a data structure used for storing variations of pixel values of the characteristic points in the lip areas in the frames of a preset lip-language video, and the second characteristic matrix is a data structure used for storing variations of pixel values of the characteristic points in the lip areas in the frames of the lip shape variation video.

17. The medium of claim 13, wherein a preset lip-language video is determined as the matched preset lip-language video if a similarity degree between the second characteristic matrix of the lip shape variation video and a first characteristic matrix of the preset lip-language video reaches a preset proportion.

* * * * *